(12) United States Patent
Simon et al.

(10) Patent No.: US 11,027,215 B1
(45) Date of Patent: Jun. 8, 2021

(54) VACUUM DISTILLATION APPARATUS AND METHODS

(71) Applicant: Marion Mechanical LLC, Coarsegold, CA (US)

(72) Inventors: Paul Simon, San Jose, CA (US); Craig Marion, Livermore, CA (US); Tina Asher Marion, Livermore, CA (US)

( * ) Notice: Subject to any disclaimer, the term of this patent is extended or adjusted under 35 U.S.C. 154(b) by 6 days.

(21) Appl. No.: 16/372,179

(22) Filed: Apr. 1, 2019

(51) Int. Cl.
*B01D 1/22* (2006.01)
*B01D 3/10* (2006.01)
*B01D 5/00* (2006.01)
*B01D 1/30* (2006.01)

(52) U.S. Cl.
CPC .............. *B01D 1/225* (2013.01); *B01D 1/30* (2013.01); *B01D 3/106* (2013.01); *B01D 5/006* (2013.01)

(58) Field of Classification Search
None
See application file for complete search history.

(56) References Cited

U.S. PATENT DOCUMENTS

| 1,899,916 | A | 2/1933 | Payne ........................ 196/114 |
| 3,434,935 | A | 3/1969 | Habendorff et al. ......... 202/187 |
| 3,477,491 | A | 11/1969 | MacHenry et al. .......... 159/6.3 |
| 3,695,327 | A | 10/1972 | Widmer ....................... 159/6.2 |
| 5,256,250 | A | 10/1993 | Pelzer ......................... 159/6.3 |
| 2011/0100561 | A1 | 5/2011 | Alasti et al. ................ 159/11.1 |
| 2018/0065060 | A1 | 3/2018 | Wells et al. |
| 2018/0140965 | A1* | 5/2018 | Flora ....................... C11B 1/10 |

* cited by examiner

*Primary Examiner* — Derek N Mueller
(74) *Attorney, Agent, or Firm* — Adibi IP Group, P.C.; Amir V. Adibi; Andrew C. Palmer

(57) ABSTRACT

Vacuum distillation apparatus and methods are provided. In an embodiment, an apparatus is provided that includes an evaporation chamber having a bottom flow rate control (FRC) surface that is curved to provide multiple flow rates to a solution as it flows across the bottom surface. The apparatus also includes a wiper that is curved to match the curve of the bottom FRC surface and wipes the bottom FRC surface to distribute the solution. A heater heats the bottom FRC surface to evaporate one or more components from the moving solution.

17 Claims, 11 Drawing Sheets

BLOCK DIAGRAM OF CONTROLLER

VACUUM DISTILLATION APPARATUS AND METHODS

TECHNICAL FIELD

The present invention relates to apparatus and methods for vacuum distillation.

BACKGROUND INFORMATION

Distillation is used to separate individual components out of a solution based on different boiling points. Vacuum distillation refers to performing this process at less than atmospheric pressure. Vacuum distillation can increase evaporation rates and allow distillation to occur at reduced temperatures for heat sensitive materials. In addition to reduced pressure, increasing the surface area of the solution will increase the rate of evaporation.

Unfortunately, typical vacuum distillation equipment is either designed for low volume, laboratory use, or relies on gravity for flow control. Laboratory equipment may utilize glass flasks that may be fragile and difficult to handle. Gravity fed industrial systems may not offer the flow rate control needed for process optimization.

Therefore, it would be desirable to have a way to perform vacuum distillation that mitigates the problems associated with conventional vacuum distillation equipment.

SUMMARY

A vacuum distillation apparatus includes a vacuum chamber having a curved or angled flow rate control (FRC) surface. During a distillation process, a solution flows across the FRC surface and a solvent in the solution is evaporated. The FRC surface is not a vertical surface. The FRC surface is not a flat surface. The vacuum distillation apparatus includes corresponding curved or angled wipers that wipe the solution along the FRC surface. The wipers enhance evaporation efficiency and improve overall performance of the vacuum distillation process. An alternative embodiment includes a second surface located above the FRC surface to provide short path distillation. In still another embodiment, a second curved FRC surface and corresponding wipers are added to further improve the distillation process.

In one embodiment, an apparatus is provided that includes an evaporation chamber having a bottom flow rate control (FRC) surface that is curved to provide multiple flow rates to a solution as it flows across the bottom surface. The apparatus also includes a wiper that is curved to match the curve of the bottom FRC surface and wipes the bottom FRC surface to distribute the solution. A heater heats the bottom FRC surface to evaporate one or more components from the moving solution.

In another embodiment, the evaporation chamber includes a top surface that is selectively spaced above the bottom FRC surface. The top surface is shaped so that the vapor condenses on the top surface and flows along the shape of the top surface to a collection location.

In another embodiment, the evaporation chamber further includes a top flow rate control (FRC) surface that is curved to provide multiple flow rates to the solution as it flows across the top surface. A second wiper is provided that wipes the top FRC surface to distribute the solution to an outer edge of the top surface and onto the bottom surface. The second wiper is curved to match the curve of the top FRC surface.

In another embodiment, a method is provided for operating an evaporation chamber having a flow rate control (FRC) surface that is curved to provide multiple flow rates to a solution, a wiper that is curved to match the curve of the FRC surface and that wipes the FRC surface to distribute the solution. The method comprises heating the FRC surface and adding the solution to the chamber so that the solution flows across the FRC surface at the multiple flow rates, is distributed by the wiper, and at least a portion of the solution evaporates to form a vapor. The method also comprises collecting the vapor and circulating remaining solution back into the chamber.

Additional features and benefits of the embodiments of the present invention will become apparent from the detailed description, figures and claims set forth below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

In various embodiments, a vacuum distillation apparatus is provided for distilling a solution into one or more components. For example, the vacuum distillation apparatus is suitable to distill a solution comprising a solvent and a compound for the purpose of removing the solvent and extracting the compound. Reference will now be made in detail to some embodiments of the vacuum distillation apparatus, examples of which are illustrated in the accompanying drawings.

Figure 1:
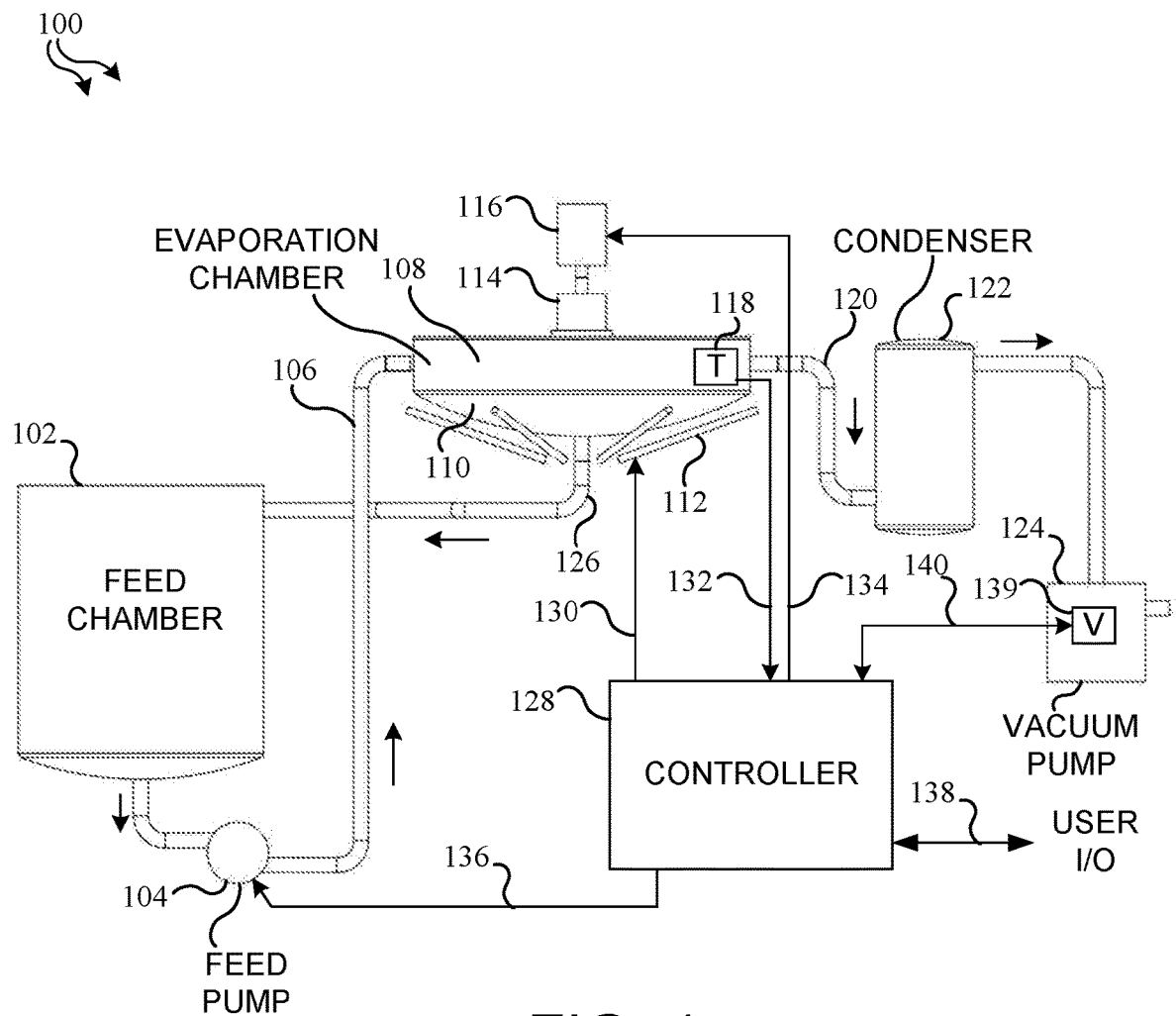
FIG. 1 shows an embodiment of a vacuum distillation apparatus.

FIG. 1 shows an embodiment of a vacuum distillation apparatus 100. The apparatus 100 comprises feed chamber 102, feed pump 104, evaporation chamber 108, motor 116, condenser 122, and vacuum pump 124. The apparatus 100 also comprises controller 128 that operates to receive user input 138 and to control various functions of the apparatus 100.

During operation, a solution in the feed chamber 102 is moved from the feed chamber 102 into pipe 106 by feed pump 104. The solution flows into the evaporation chamber 108. The evaporation chamber 108 is heated by heater 112. The motor 116 drives a shaft placed through a rotary feedthrough 114 and into a top portion of the evaporation chamber 108 to turn a wiper mechanism (not shown). A temperature sensor 118 provides measurements of internal chamber temperature to the controller 128.

A solvent in the solution evaporates in the evaporation chamber 108 to form a solvent vapor (or component vapor) that is pulled through pipe 120 into condenser 122 where it is collected. The solution that does not evaporate flows through an opening in the bottom of the evaporation chamber. It should be noted that in other embodiments, the evaporant can be any type of component vapor.

In one embodiment, a single pass through the evaporation chamber 108 is enough to evaporate all the solvent so that the solution flowing into pipe 126 can be collected. In another embodiment, one pass through the evaporation chamber 108 does not remove all the solvent so that the solution flowing into pipe 126 is carried back to the feed chamber 102. During this process, vacuum pump 124 maintains a constant vacuum in the evaporation chamber 108.

The controller 128 receives user input 138 that identifies various operating modes in which the apparatus 100 should be controlled to operate. The controller 128 outputs a pump control signal 136 that controls the operation of the feed pump 104, and a heater control signal 130 that controls the operation of the heater 112. The controller 128 receives temperature measurements of the evaporation chamber 108 through temperature signal 132. A vacuum sensor 139 sends vacuum measurements 140 to the controller 128 allowing the controller to monitor and maintain vacuum pressure. Additionally, the controller 128 controls the operation of the motor 116 using motor control signal 134.

In various embodiments, the evaporation chamber 108 includes a bottom portion 110 that provides an internal flow rate control surface (not shown). The FRC surface operates to control the flow of solution through the evaporation chamber to control the rate and/or other characteristic of the evaporation process. More detailed descriptions of the bottom portion 110 and associated flow rate control surface are provided below.

Figure 2:
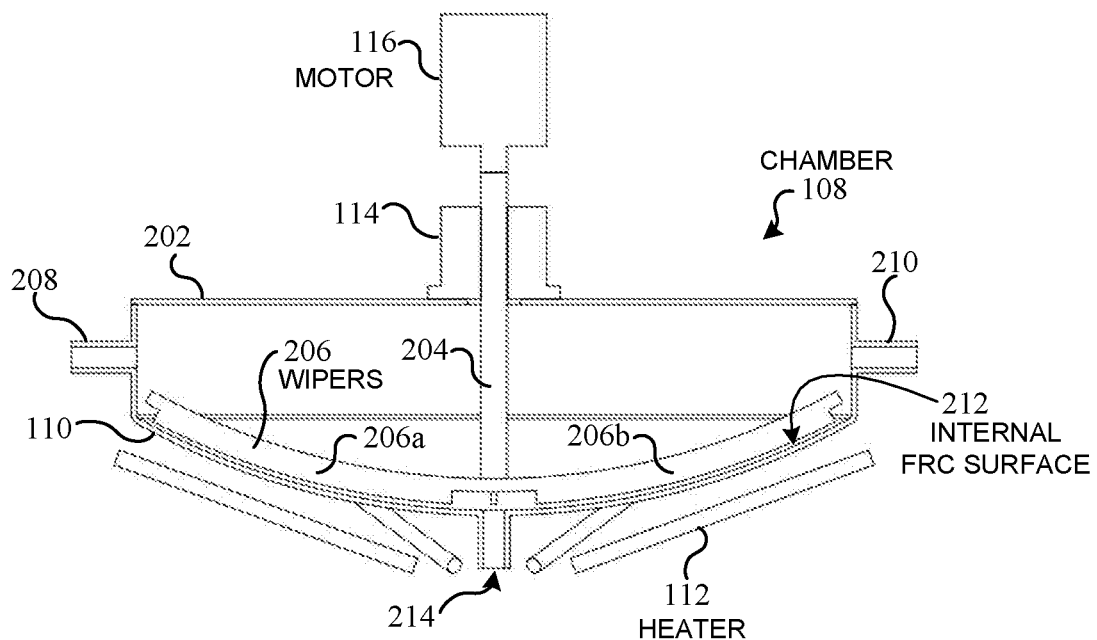
FIG. 2 shows a cross-section view of the evaporation chamber shown in FIG. 1.

FIG. 2 shows a cross-section view of the evaporation chamber 108 shown in FIG. 1. This cross-section view illustrates that the evaporation chamber 108 includes a top 202 having an opening through which a shaft 204 is inserted. One end of the shaft 204 is connected to the motor 116 and the other end of the shaft 204 is connected to a wiper mechanism having a first wiper portion 206a and a second wiper portion 206b. The wiper mechanism may have any number of wiper portions.

The chamber 108 includes an input port 208 and an output port 210. The bottom portion 110 of the chamber 108 form an internal FRC surface 212. The heater 112 heats the FRC surface 212.

During operation of the apparatus 100, the wiper portions 206a-b wipe along the heated internal FRC surface 212 of the bottom portion 110 of the evaporation chamber 108 to facilitate evaporation of solution fed into the chamber. Any solution that does not evaporate exits the chamber through the exit port 214.

In various embodiments, the internal FRC surface 212 of the bottom portion 110 has a selected curved shape. The wiper portions 206a and 206b are shaped with the same contour as the internal FRC surface 212.

Figure 3:
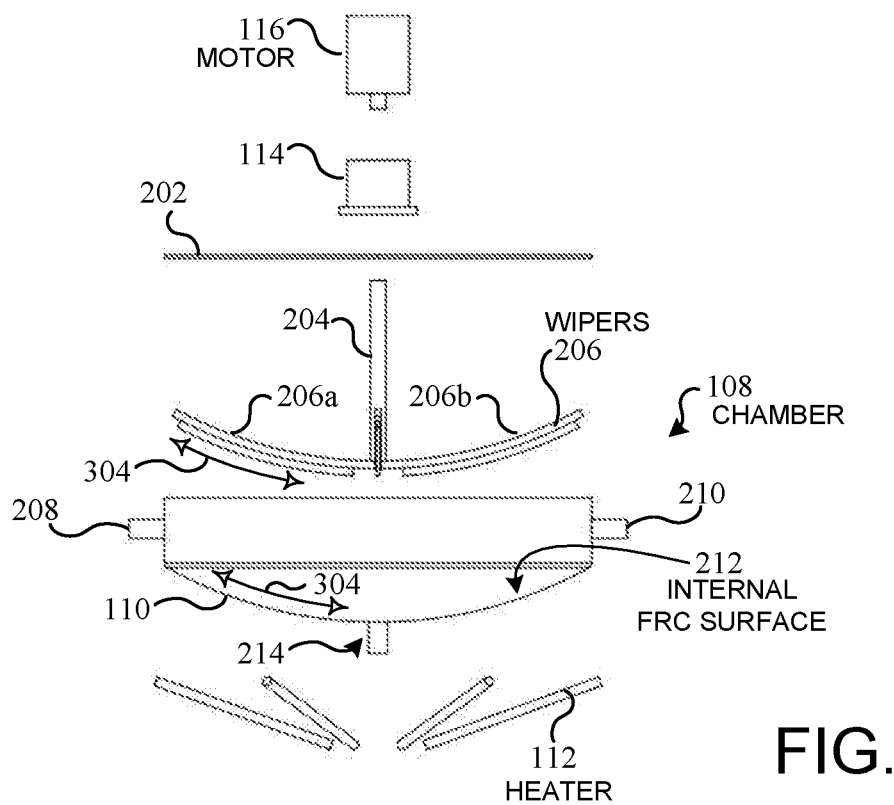
FIG. 3 shows an exploded view of the evaporation chamber shown in FIG. 2.

FIG. 3 shows an exploded view of the evaporation chamber 108 shown in FIG. 2. As illustrated in FIG. 3, the bottom portion 110 of the evaporation chamber 108 includes the internal flow rate control surface 212. The surface 212 has a curvature 304, which controls the flow rate of solution along the flow rate control surface 212 as it moves to the exit port 214.

The wiper portions 206a and 206b have the same curvature 304 as the flow rate control surface 212 so when the motor 116 turns the shaft 204, the wiper portions 206a-b wipe smoothly along the flow rate control surface 212 to move the solution.

Figure 4:
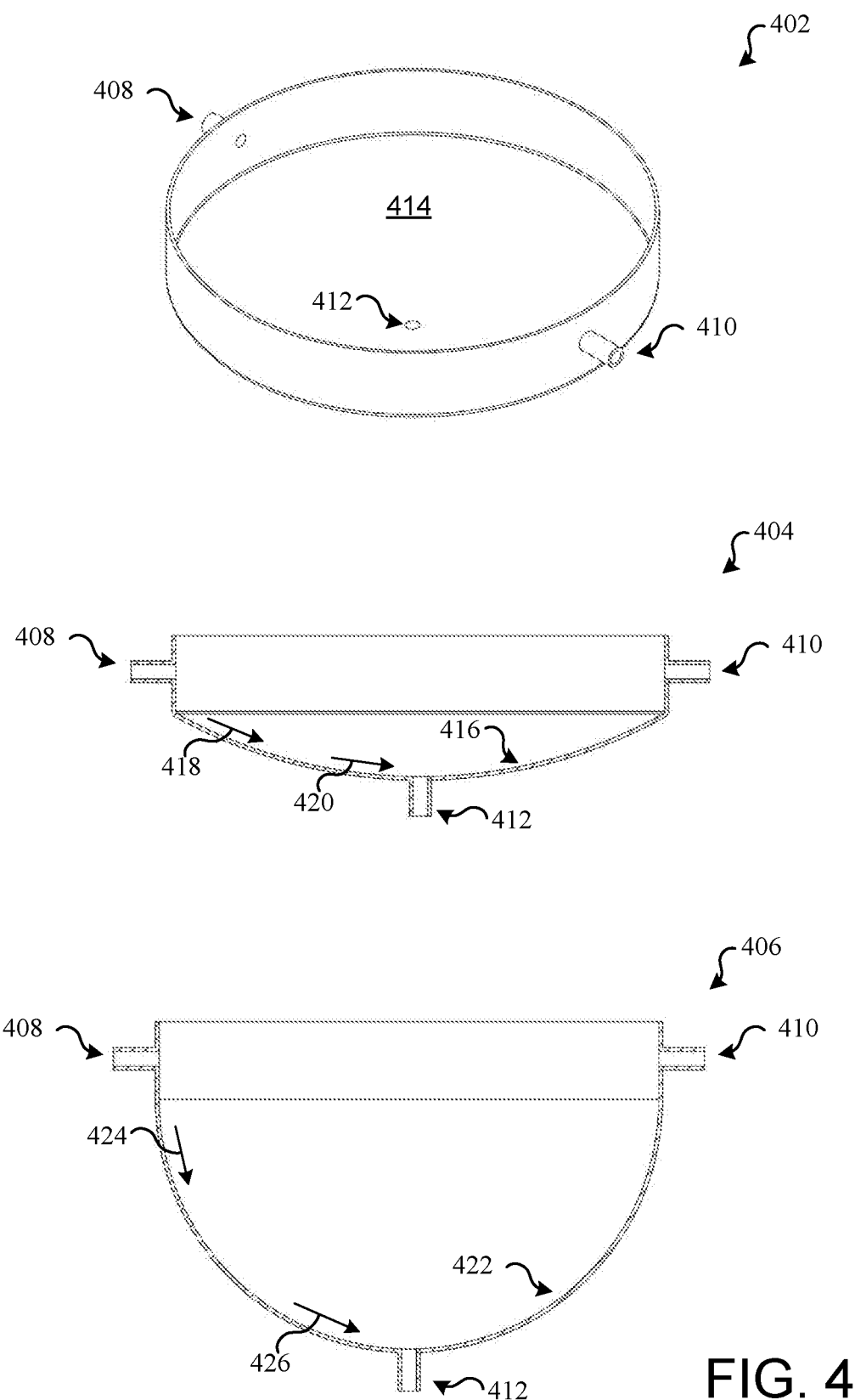
FIG. 4 shows embodiments of evaporation chambers having different flow rate control surface shapes.

FIG. 4 shows embodiments of evaporation chambers having bottom portions that are shaped to provide different flow rate control surfaces. A first chamber 402 is shown in perspective view and includes an input port 408, output port 410, exit port 412, and flow rate control surface 414. Solution input through the input port 408 flows across the FRC surface 414 toward the exit port 412. The FRC surface 414 is heated by the heater 112 (not shown here) so that the solution evaporates as it flows down the surface 414 toward the exit port 412. The evaporant exits through the output port 410. The shape of the FRC surface 414 controls the rate at which the material flows to the exit port.

A second evaporation chamber 404 is shown in a cross-section view. The second chamber 404 has a flow rate control surface 416 that has an elliptical shape. This shape determines the flow rate of solution flowing across the surface. For example, as solution flows across the surface 416 and moves closer to the exit port 412, the solution experiences a first flow rate 418 at a top portion of the flow rate control surface 416 and a second flow rate 420 at a bottom portion of the flow rate control surface 416.

A third chamber 406 is shown in a cross-section view. The third chamber 406 has a flow rate control surface 422 that has a spherical shape. This shape determines the flow rate of solution flowing across the surface toward the exit port 412. For example, as the solution flows across the surface 422 and moves closer to the exit port, the solution experiences a first flow rate 424 at a top portion of the flow rate control surface 422 and a second flow rate 426 at a bottom portion of the flow rate control surface 422.

As illustrated in FIG. 4, a variety of flow rate control surface shapes can be selected to control the rate at which solution moves across the flow rate control surface to the exit port.

Flow Rate Control Surface

In various embodiments, a flow rate control surface is provided that forms the inner wall of an evaporation chamber and is curved to control the gravity-fed flow of solution across the surface. The curve of this surface may be of a constant or varying radius. The slope of this curved surface, in conjunction with the speed of the wiper, affects the speed at which the solution flows across this surface. Changes to this slope either increase or decrease the amount of time the solution is in contact with the heated evaporation surface.

Figure 5:
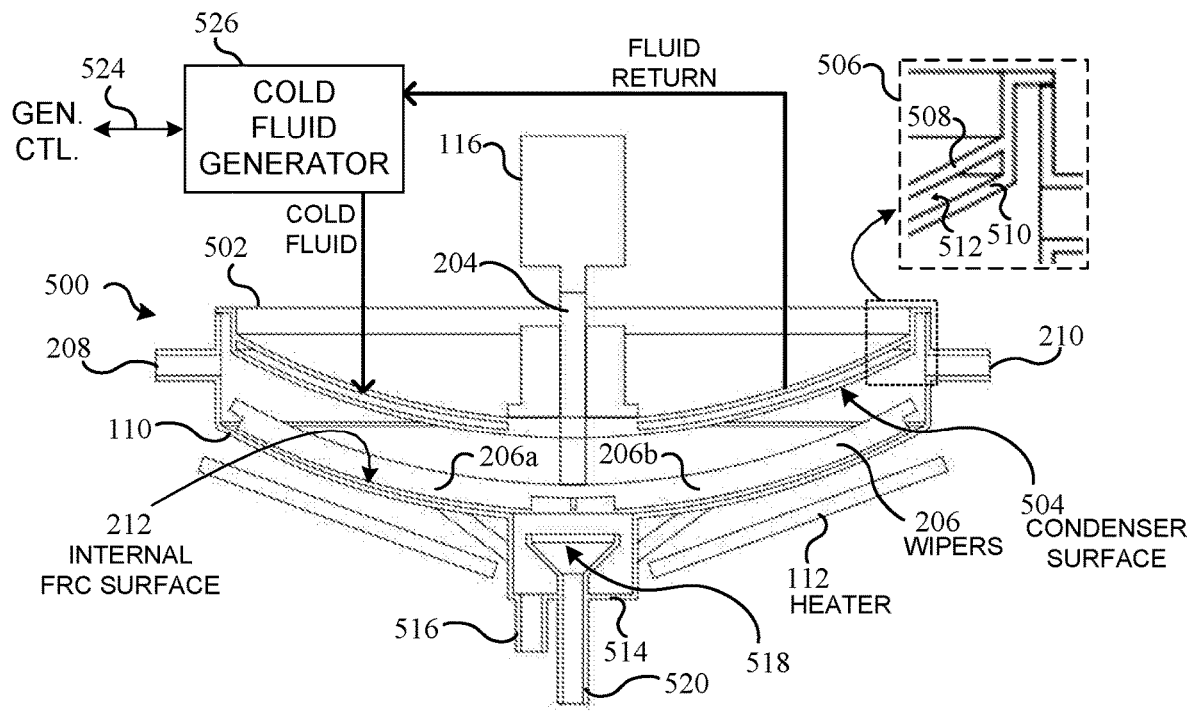
FIG. 5 shows a cross-section view of an evaporation chamber for use in short path distillation.

FIG. 5 shows a cross-section view of an evaporation chamber 500 that performs short path distillation. The chamber 500 is similar to the chamber 108 but includes additional features to provide short path distillation in addition to wiped film distillation.

In an embodiment, the chamber 500 includes a chamber top 502 that has a condenser surface 504 that is exposed inside the evaporation chamber 500. As illustrated by the inset 506, the chamber top 502 comprises an upper portion 508 and a lower portion 510, which together form a gap 512. During operation of the chamber 500, the gap 512 is filled with a fluid having a selected temperature that sets the temperature of the condenser surface 504. For example, a cold fluid generator 526 operates to generate and circulate a fluid at a selected temperature under the control of a generator control signal 524. The cooled fluid sets the temperature of the condenser surface 504 and determines the types of evaporant that will condense on the condenser surface 504.

The condenser surface 504 and the FRC surface 212 form concentric surfaces spaced approximately 1 to 5 centimeters (cm) apart. Solution evaporates from the FRC surface 212 and forms a vapor that travels the short distance (short path) to the condenser surface 504 where it is condensed. By tuning the temperature and/or adding additional condensers, a short path system can be assembled to fractionally distill solutions down into various components.

The chamber 500 also comprises an outer collector 514 that collects material that is moved along the flow rate control surface 212 toward a center opening and exits the chamber 500 through exit port 516. A center collector 518 collects condensate that drips down from a collection location on the condenser surface 504. This condensate flows from the chamber 500 through pipe 520.

Figure 6:
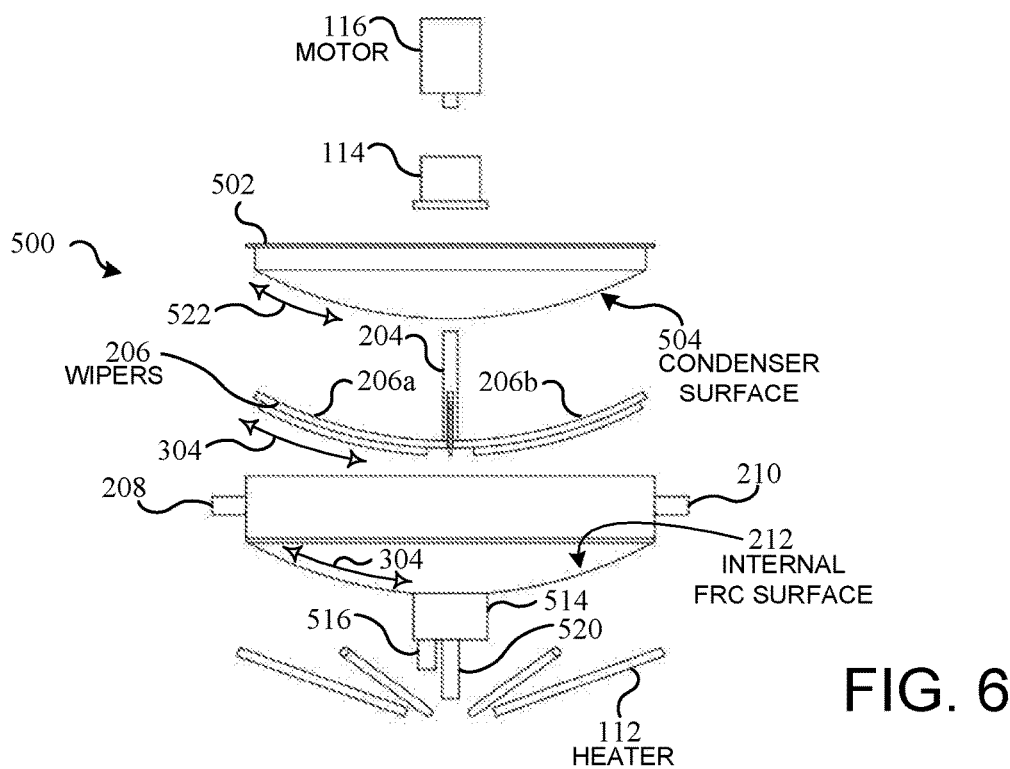
FIG. 6 shows an exploded view of the evaporation chamber shown in FIG. 5.

FIG. 6 shows an exploded view of the evaporation chamber 500 shown in FIG. 5. As illustrated in FIG. 6, the condensation surface 504 of the evaporation chamber top 502 has a curvature 522. In an embodiment, the curvature 522 is identical to the curvature 304 of the flow rate control surface 212. In another embodiment, the curvature 522 is different from the curvature 304 of the flow rate control surface 212.

Figure 7:
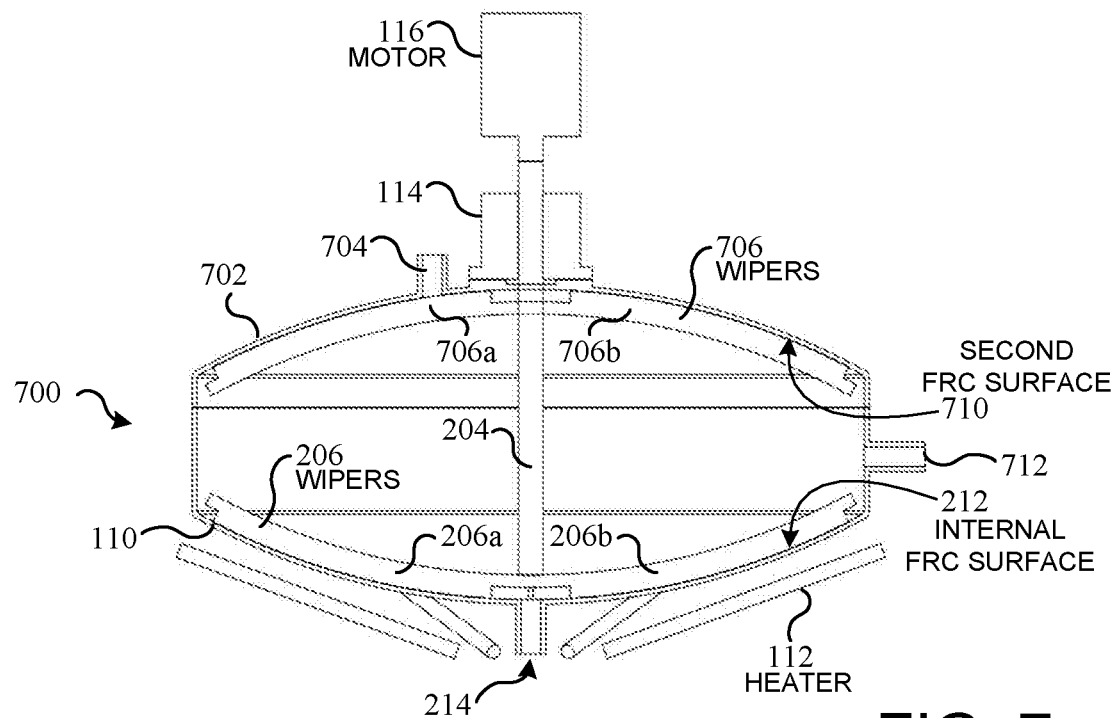
FIG. 7 shows a cross-section view of an evaporation chamber for use in vacuum distillation.

FIG. 7 shows a cross-section view of an evaporation chamber 700 that is similar to the chamber 108 but includes additional features to provide wiped film distillation.

In an embodiment, the chamber 700 includes a curved top portion 702 that provides a second flow rate control surface 710 that is exposed inside the evaporation chamber 700. The chamber 700 also includes wipers 706a-b that are connected to the shaft 204 and shaped to wipe across the flow rate control surface 710. The top 702 also includes an inlet port 704 that is used to introduce solution into the chamber 700.

During operation of the chamber 700, solution introduced into the chamber using the inlet port 704 flows along the second flow rate control surface 710 and is wiped toward the chamber sides by the wipers 706a-b. The solution flows down the chamber sides and onto the first flow rate control surface 212. The solution is wiped along the first flow rate control surface 212 by the wipers 206a-b. The solution either evaporates, due to the heat provided by the heater 112, or flows into the exit port 214 at the bottom of the chamber. The component that evaporates is removed through the outlet port 712.

Figure 8:
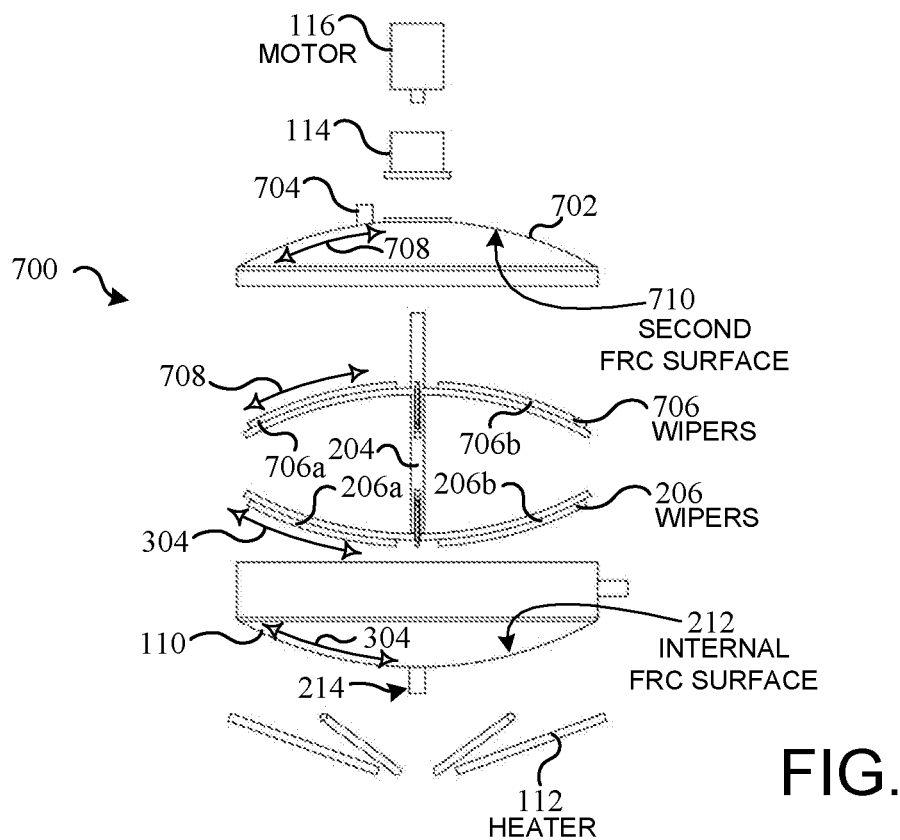
FIG. 8 shows an exploded view of the evaporation chamber shown in FIG. 7.

FIG. 8 shows an exploded view of the evaporation chamber 700 shown in FIG. 7. As illustrated in FIG. 8, the second flow rate control surface 710 of the top portion 702 of the evaporation chamber has a curvature 708. The wipers 706a-b have the same curvature 708 as the second flow rate control surface 710. In an embodiment, the curvature 708 is identical to the curvature 304 of the first flow rate control surface 212. In another embodiment, the curvature 708 is different from the curvature 304 of the first flow control surface 212.

Figure 9:
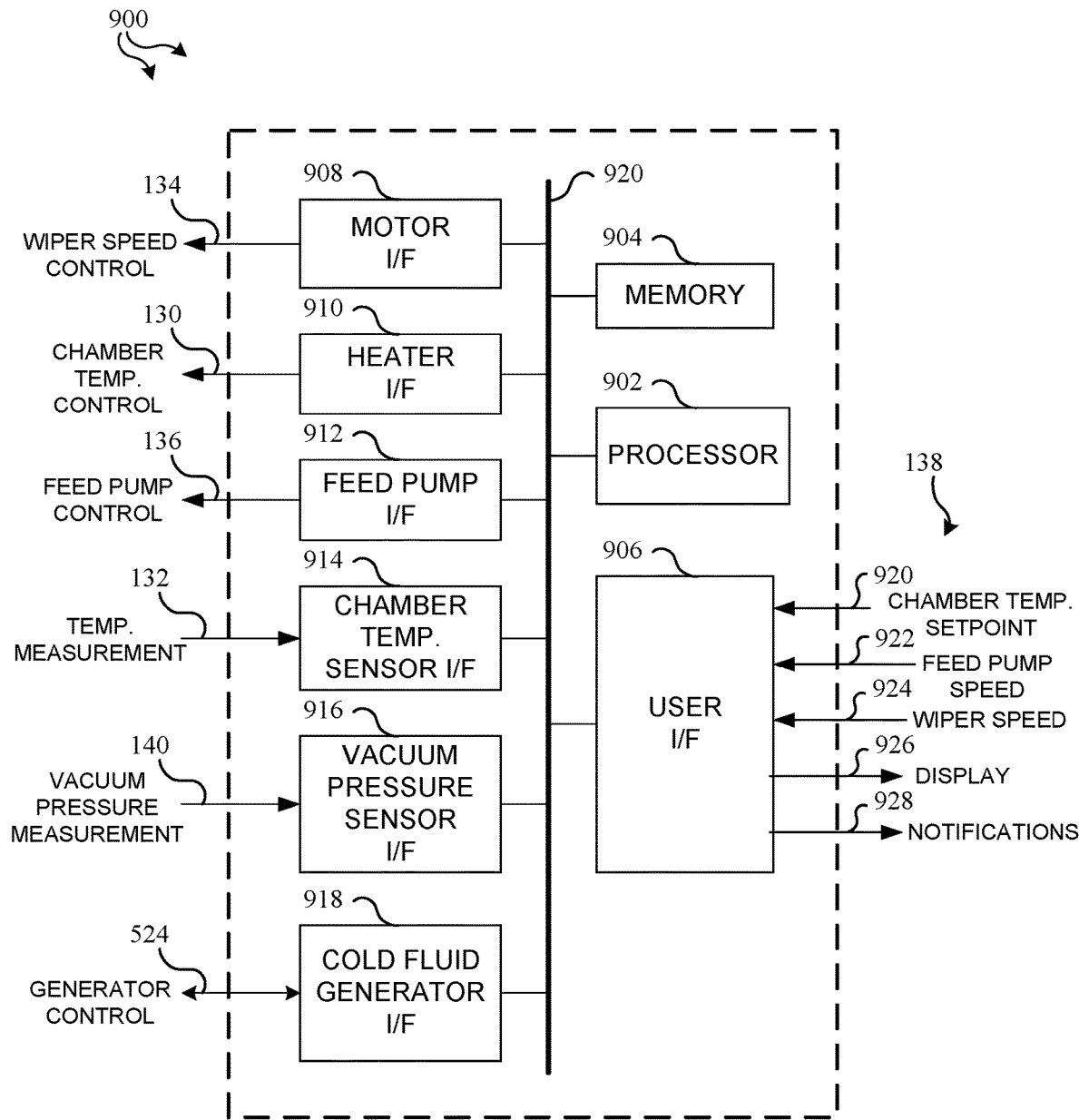
FIG. 9 shows an embodiment of a controller.

FIG. 9 shows an embodiment of a controller 900 suitable for use to control the distillation apparatuses shown herein. For example, the controller 900 is suitable for use as the controller 128 shown in FIG. 1. In an embodiment, the controller 900 comprises processor 902, memory 904, user interface 906, motor interface 908, heater interface 910, feed pump interface 912, chamber temperature sensor interface 914, vacuum pressure sensor interface 916, and cold fluid generator interface 918 all coupled to communicate using bus 920. In various embodiments, each of the components of the controller 900 comprises any number, combination, selection and/or order of components selected from a set of components comprising a processor, CPU, state machine, programmable array, firmware, volatile or non-volatile memory, registers, logic, discrete components, and/or other suitable hardware.

In an embodiment, the motor interface 908 interfaces with the motor 116 using the motor speed control signal 134. By controlling the speed of the motor 116, the speed of the wipers 206/706 are also controlled. The motor interface 908 receives motor speed control instructions from the processor 902 and uses these instructions to determine parameters of the motor speed control signal 134 to obtain the requested speed from the motor 116.

In an embodiment, the heater interface 910 interfaces with the heater 112 using the heater control signal 130. The heater interface 910 receives heater control instructions from the processor 902 and uses these instructions to determine parameters of the heater control signal 134 to obtain the requested heat output from the heater 112.

In an embodiment, the feed pump interface 912 interfaces with the feed pump 104 using the feed pump control signal 136. The feed pump interface 912 receives feed pump control instructions from the processor 902 and uses these instructions to determine parameters of the feed pump control signal 134 to obtain the requested feed pump operation from the feed pump 112.

In an embodiment, the chamber temperature sensor interface 914 interfaces with the chamber temperature sensor 118 by receiving the temperature sensor output signal 132 to determine a temperature measurement of the chamber that is passed to the processor 902.

In an embodiment, the vacuum pressure sensor interface 916 interfaces with the vacuum pressure sensor 139 by receiving the vacuum pressure output signal 140 to determine a vacuum pressure measurement of the chamber that is passed to the processor 902.

In an embodiment, the cold fluid generator interface 918 interfaces with the cold fluid generator 526 using control signaling 524. During operation, the processor 902 controls the interface 918 to set and monitor the temperature of fluid circulating through the gap 512 of the evaporation chamber top 502 so as to set a temperature of the condenser surface 504.

In an embodiment, the memory 904 comprises any suitable volatile and/or nonvolatile memory that is used to store parameters, data, log events, computation results or any other data or information used by the system.

In an embodiment, the user interface 906 interacts with users to receive user input and provide user outputs. The user interface 906 receives a chamber temperature setpoint value 920, feed pump speed 922, and wiper speed 924 from a user. These inputs are passed to the processor 902. The user interface 906 outputs display information 926 and notification 928 to users. These outputs are provided to the user interface 906 from the processor 902 and present to the user. In other embodiments, any or all of the interfaces 908-916 interact with the user interface 906 to communicate information to users and receive inputs from users.

The processor 902 controls the operation of the system. The processor 902 processes received user inputs and measurement information and generates control instructions that are passed to the interfaces 908-912 to control the operation of the system to perform wiped film distillation and short path distillation. A more detailed description of the operation of the controller 900 is provided below.

Figure 10:
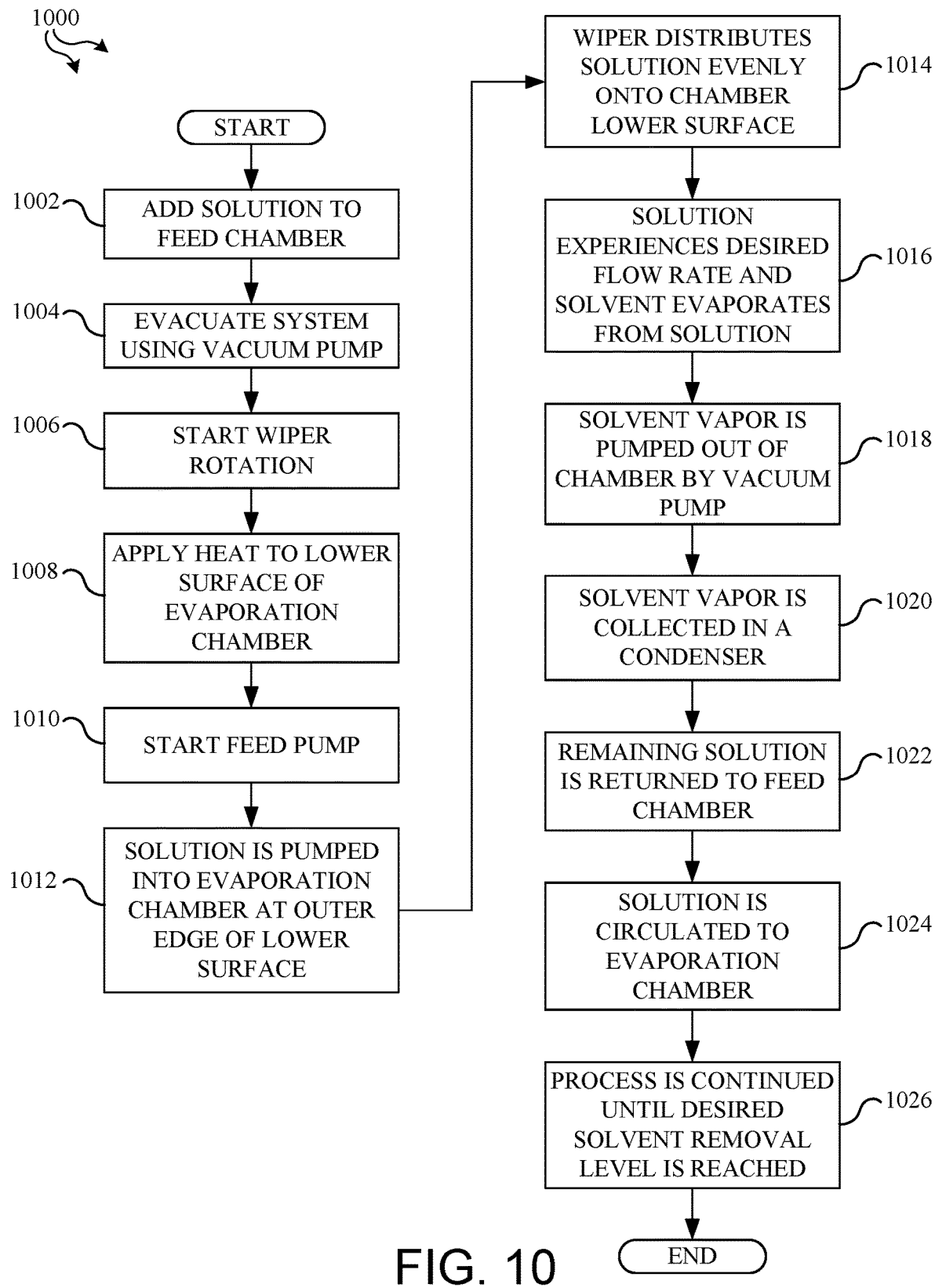
FIG. 10 shows an embodiment of a method for operating a vacuum distillation apparatus having an evaporation chamber as shown in FIG. 2.

FIG. 10 shows an embodiment of a method 1000 for operating a vacuum distillation apparatus having an evaporation chamber as shown in FIG. 2. For example, the method 1000 will be described with reference to the distillation apparatus shown in FIG. 1 and having an evaporation chamber as shown in FIG. 2 with a selected FRC surface as shown in FIG. 4. For example, an elliptical flow rate control surface can be utilized.

At block 1002, the solution is added to a feed chamber. For example, the solution to be distilled is manually or automatically added to the feed chamber 102.

At block 1004, the distillation system is evacuated using a vacuum pump. For example, the processor 902 controls the vacuum pump interface 916 to start the vacuum pump 139 and maintain a desired vacuum pressure. The desired vacuum pressure may be provided by a user through the user interface 906.

At block 1006, surface wipers are started in rotation. For example, the processor 902 controls the motor interface 908 to activate the motor 116 to turn at a selected speed. The wipers 206a-b that are coupled to the motor 116 will turn at this same speed. The desired wiper speed may be provided by a user through the user interface 906.

At block 1008, heat is applied to the lower surface of the evaporation chamber. For example, the processor 902 controls the heater interface 910 to activate the heater 112 to achieve a desired chamber temperature. The temperature sensor 118 in the chamber measures the temperature and provides these measurements to the temperature sensor interface 914, which passes these measurements to the processor 902. Thus, the processor 902 is able to monitor the chamber temperature and control the heater 112 to achieve a desired temperature. The desired temperature may be provided by a user through the user interface 906.

At block 1010, a feed pump is started to move the solution from the feed chamber into the evaporation chamber. For example, the processor 902 controls the feed pump interface 912 to activate the feed pump 104 to begin pumping solution from the feed chamber 102 into the evaporation chamber 108.

At block 1012, the solution is pumped into the evaporation chamber at the outer edge of the bottom portion. For example, the solution is pumped through the input port 208 and into the evaporation chamber at the outer edge.

At block 1014, the wipers operate to evenly distribute solution onto the chamber surface. For example, the wipers 206a-b are turned by the motor 116 to evenly distribute the solution onto flow rate control surface 212.

At block 1016, the solution experiences the desired flow rate provided by the FRC surface and a solvent evaporates from the solution. For example, as the solution is spread across the heated flow rate control surface 212 and flows according to the FRC surface 212, at least a portion of the solution evaporates to form a solvent vapor.

At block 1018, the solvent vapor is pumped out of the evaporation chamber by the vacuum pump. For example, the operation of the vacuum pump 124 pumps the solvent vapor out through the output port 210 and into the pipe 120.

At block 1020, the solvent vapor is collected in a condenser. For example, the solvent vapor flows through the pipe 120 and into the condenser 122.

At block 1022, the remaining solution is returned to the feed chamber. For example, the portion of the solution that does not evaporate in the evaporation chamber flows to the bottom of the flow control surface 212 and out the bottom exit port 214 and is routed back to the feed chamber.

At block 1024, the solution is circulated back to the evaporation chamber from the feed chamber. For example, when the solution exits the evaporation chamber through the bottom exit port 214 it flows through the pipe 126 back into the feed chamber 102 from which it is recirculated back to the evaporation chamber 108 by the feed pump 104.

At block 1026, the process continues until the desired solvent removal level is reached. For example, the solvent captured in the condenser 122 is measured to determine when the desired solvent removal level is reached. When the desired level is reached, the controller 128 shuts down operation of the distillation apparatus.

Thus, the method 1000 operates a vacuum distillation apparatus to remove a solvent from a solution. It should be noted that the operations of the method 1000 may be added to, subtracted from, deleted, changed, rearranged or otherwise modified within the scope of the embodiments.

Figure 11:
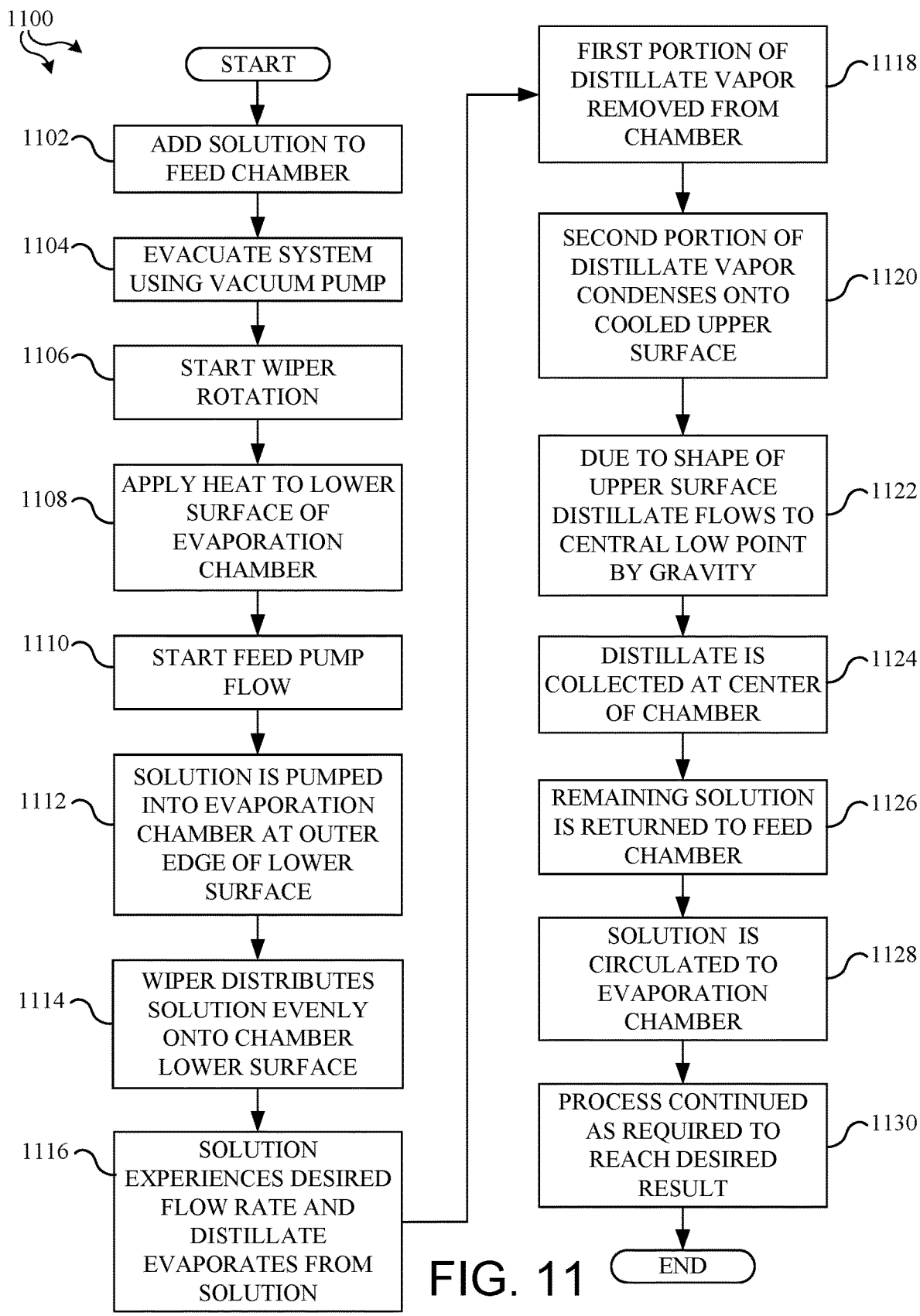
FIG. 11 shows an embodiment of a method for operating a vacuum distillation apparatus having an evaporation chamber as shown in FIG. 5 to provide short path distillation.

FIG. 11 shows an embodiment of a method 1100 for operating a vacuum distillation apparatus having an evaporation chamber as shown in FIG. 5 to provide short path distillation. For example, the method 1100 will be described with reference to the distillation apparatus shown in FIG. 1 and having an evaporation chamber as shown in FIG. 5 with a selected FRC surface as shown in FIG. 4. For example, an elliptical flow rate control surface can be utilized.

At block 1102, solution is added to a feed chamber. For example, the solution to be distilled is manually or automatically added to the feed chamber 102.

At block 1104, the distillation system is evacuated using a vacuum pump. For example, the processor 902 controls the vacuum pump interface 916 to start the vacuum pump 139 and maintain a desired vacuum pressure. The desired vacuum pressure may be provided by a user through the user interface 906.

At block 1106, surface wipers are started in rotation. For example, the processor 902 controls the motor interface 908 to activate the motor 116 to turn at a selected speed. The wipers 206a-b that are coupled to the motor 116 will turn at this same speed. The desired wiper speed may be provided by a user through the user interface 906.

At block 1108, heat is applied to the bottom portion of the chamber. For example, the processor 902 controls the heater interface 910 to activate the heater 112 to achieve a desired chamber temperature. The temperature sensor 118 in the chamber measures the temperature and provides these measurements to the temperature sensor interface 914, which passes these measurements to the processor 902. Thus, the processor 902 is able to monitor the chamber temperature and control the heater 112 to achieve a desired temperature. The desired temperature may be provided by a user through the user interface 906.

At block 1110, a feed pump is started to move solution from a feed chamber. For example, the processor 902 controls the feed pump interface 912 to activate the feed pump 104 to begin pumping solution from the feed chamber 102 into the evaporation chamber 108.

At block 1112, the solution is pumped into the evaporation chamber at the outer edge of the bottom portion. For example, the solution is pumped through the input port 208 and into the evaporation chamber at the outer edge.

At block 1114, the wipers operate to evenly distribute solution onto the FRC surface. For example, the wipers 206a-b are turned by the motor 116 to evenly distribute the solution onto chamber flow rate control surface 212.

At block 1116, the solution experiences the desired flow rate provided by the FRC surface and a distillate evaporates from the solution. For example, as the solution is spread across the heated flow rate control surface 212, the solution experiences the desired flow rate and at least a portion of the solution evaporates to form a distillate vapor.

At block 1118, a first portion of the distillate is removed from the chamber. For example, the distillate vapor is removed from the chamber through the exit port 210 and captured in the condenser 122

At block 1120, a second portion of the distillate vapor condenses onto the upper cooled surface of the evaporation chamber. For example, the controller 900 controls the cold fluid generator 526 to circulate fluid at a selected temperature to set the temperature of the upper surface 504. The second portion of the distillate vapor condenses on the upper surface 504 based on the surface temperature.

At block 1122, due to the shape of the upper surface, the condensed distillate flows by gravity to a central low point (collection location) of the upper surface 504.

At block 1124, the condensed distillate is collected at the center of the chamber. For example, the condensed distillate drips from the low point of the upper surface 504 into center collector 518.

At block 1126, the remaining solution is returned to the feed chamber. For example, the portion of the solution that does not evaporate in the evaporation chamber flows to the bottom of the flow rate control surface 212 and out the exit port 516.

At block 1128, the solution is circulated back to the evaporation chamber from the feed chamber. For example, when the solution exits the evaporation chamber through the bottom exit port 516 it flows through the pipe 126 back into the feed chamber 102 from which it is circulated back to the evaporation chamber 500 by the feed pump 104.

At block 1130, the process continues until the desired distillates have been removed from the solution and collected. For example, the distillate captured at the center collector is measured to determine when the desired distillate capture level has been reached.

Thus, the method 1100 operates a vacuum distillation apparatus to remove a solvent from a solution. It should be noted that the operations of the method 1100 may be added to, subtracted from, deleted, changed, rearranged or otherwise modified within the scope of the embodiments.

Figure 12:
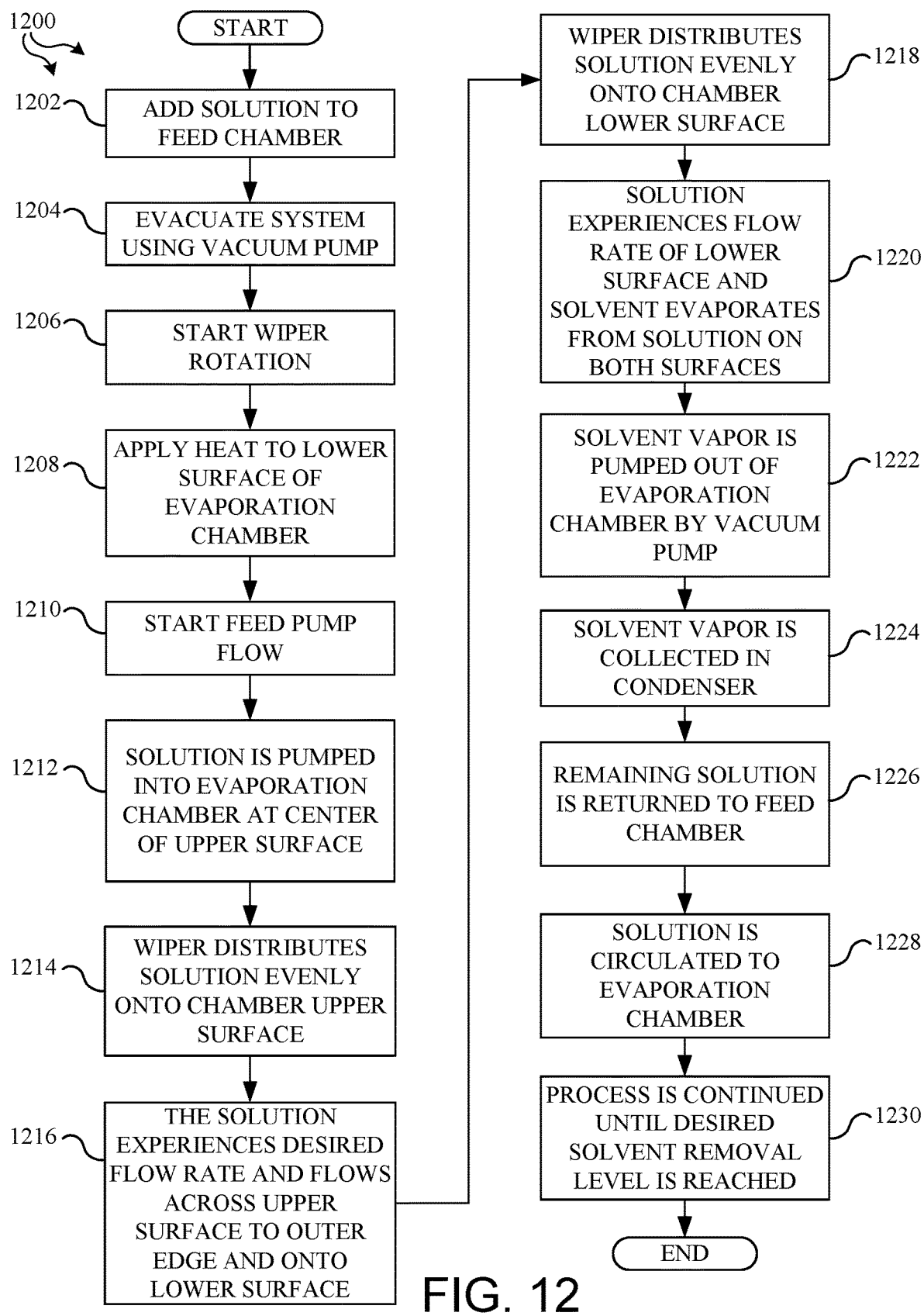
FIG. 12 shows an embodiment of a method for operating a vacuum distillation apparatus having an evaporation chamber as shown in FIG. 7.

FIG. 12 shows an embodiment of a method 1200 for operating a vacuum distillation apparatus having an evaporation chamber as shown in FIG. 7. For example, the method 1200 will be described with reference to the distillation apparatus shown in FIG. 1 and having an evaporation chamber as shown in FIG. 7 with a selected FRC surface as shown in FIG. 4. For example, an elliptical flow rate control surface can be utilized.

At block 1202, solution is added to a feed chamber. For example, the solution to be distilled is manually or automatically added to the feed chamber 102.

At block 1204, the distillation system is evacuated using a vacuum pump. For example, the processor 902 controls the vacuum pump interface 916 to start the vacuum pump 124 and maintain a desired vacuum pressure. The desired vacuum pressure may be provided by a user through the user interface 906.

At block 1206, surface wipers are started in rotation. For example, the processor 902 controls the motor interface 908 to activate the motor 116 to turn at a selected speed. The wipers 706a-b and 206a-b that are coupled to the motor 116 will turn at this same speed. The desired wiper speed may be provided by a user through the user interface 906.

At block 1208, heat is applied to the upper and lower surfaces of the evaporation chamber. For example, the processor 902 controls the heater interface 910 to activate the heater 112 to achieve a desired chamber temperature. The temperature sensor 118 in the chamber measures the temperature and provides these measurements to the temperature sensor interface 914, which passes these measurements to the processor 902. Thus, the processor 902 is able to monitor the chamber temperature and control the heater 112 to achieve a desired temperature. The desired temperature may be provided by a user through the user interface 906.

At block 1210, a feed pump is started to move solution from a feed chamber. For example, the processor 902 controls the feed pump interface 912 to activate the feed pump 104 to begin pumping solution from the feed chamber into the evaporation chamber 108.

At block 1212, the solution is pumped into the evaporation chamber at the center of the upper surface. For example, the solution is pumped through the input port 704 and into the evaporation chamber.

At block 1214, the wipers operate to evenly distribute solution across the upper FRC surface. For example, the wipers 706a-b are turned by the motor 116 to distribute the solution across the upper surface 710.

At block 1216, the solution experiences the desired flow rate of the upper FRC surface 710 and flows from the upper surface at the outer edge onto the lower FRC surface 212.

At block 1218, the wipers operate to evenly distribute solution onto the lower chamber surface. For example, the wipers 206a-b are turned by the motor 116 to evenly distribute the solution across the FRC surface 212.

At block 1220, the solution experiences the flow rate of the lower surface 212 and solvent evaporates from the solution on both surfaces 212 and 710. For example, as the solution is spread across the heated flow rate control surfaces 212 and 710 at least a portion of the solution evaporates to form a solvent vapor.

At block 1222, the solvent vapor is pumped out of the evaporation chamber by the vacuum pump. For example, the operation of the vacuum pump 124 pumps the solvent vapor out through the exit port 712 and into the pipe 120.

At block 1224, the solvent vapor is collected in a condenser. For example, the solvent vapor flows through the pipe 120 and into the condenser 122.

At block 1226, the remaining solution is returned to the feed chamber. For example, the portion of the solution that does not evaporate in the evaporation chamber flows to the bottom of the FRC surface 212, out the bottom exit port 214, and is routed back to the feed chamber.

At block 1228, the solution is circulated back to the evaporation chamber from the feed chamber. For example, when the solution exits the evaporation chamber through the bottom exit port 214 it flows through the pipe 126 back into the feed chamber 102 from which it is circulated back to the evaporation chamber 108 by the feed pump 104.

At block 1230, the process continues until the desired solvent removal level is reached. For example, the solvent captured in the condenser 122 is measured to determine when the desired solvent removal level is reached. When the desired level is reached, the controller 128 shuts down operation of the distillation apparatus.

Thus, the method 1200 operates a vacuum distillation apparatus to remove a solvent from a solution. It should be noted that the operations of the method 1200 may be added to, subtracted from, deleted, changed, rearranged or otherwise modified within the scope of the embodiments.

Figure 13:
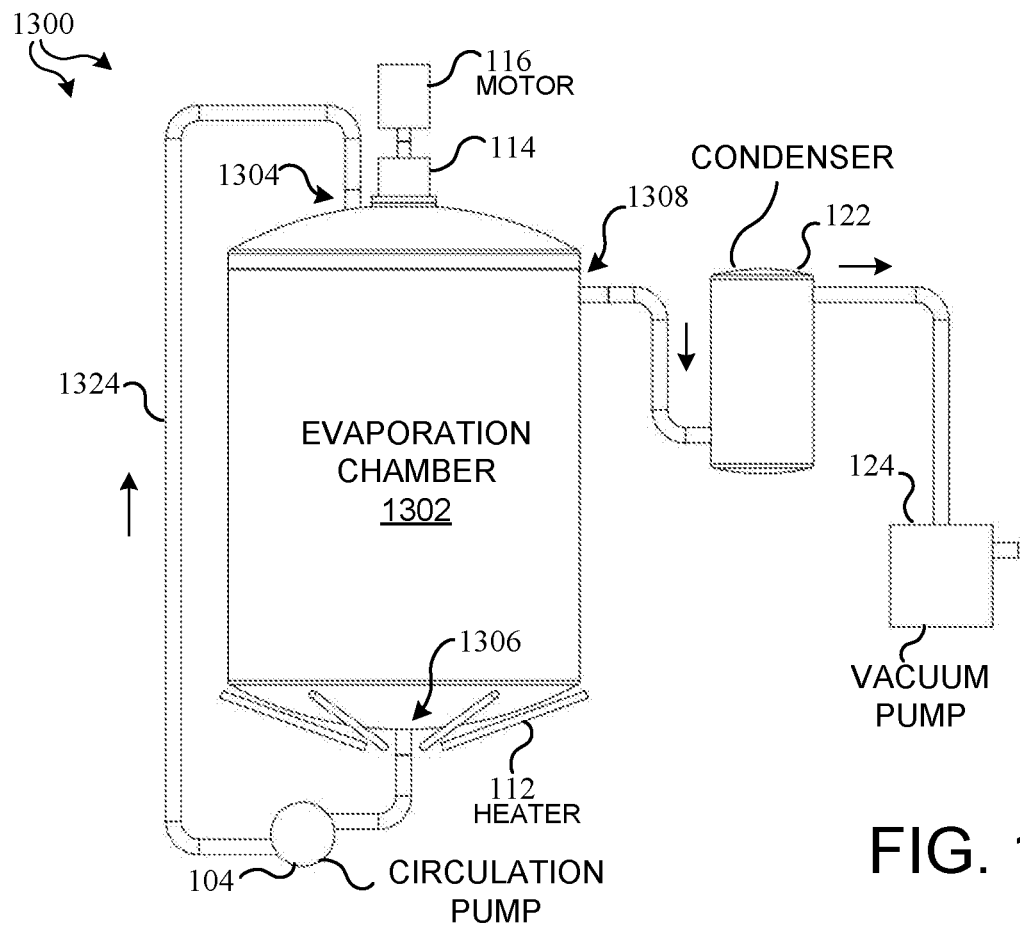
FIG. 13 shows an embodiment of a vacuum distillation apparatus.

FIG. 13 shows an exemplary embodiment of a vacuum distillation apparatus 1300. The apparatus 1300 is similar to the apparatus 100 shown and FIG. 1 and therefore components described with reference to FIG. 1 will not be described again here. The apparatus 1300 comprises evaporation chamber 1302, feed pump 104, motor 116, condenser 122, and vacuum pump 124. The apparatus 1300 also comprises a controller (not shown) that operates to receive user input and to control various functions of the apparatus 1300. For example, the controller 900 is suitable to perform these functions.

During operation, a solution is placed into the evaporation chamber 1302. The evaporation chamber 1302 is heated by heater 112 and low pressure is maintained by the vacuum pump 124. The motor 116 drives a shaft placed through a rotary feedthrough 114 and into a top portion of the evaporation chamber 1302 to turn two wiper mechanisms (not shown).

A solvent in the solution evaporates in the evaporation chamber 1302 to form a solvent vapor that is pulled through output port 1308 into condenser 122 where it is collected. The feed pump 104 pulls the solution that does not evaporate through a recirculation port 1306 to recirculate the fluid through pipe 1324 and into the chamber 1302 through return port 1304. The solution is continually recirculated until a desired amount of solvent is removed from the solution.

Figure 14:
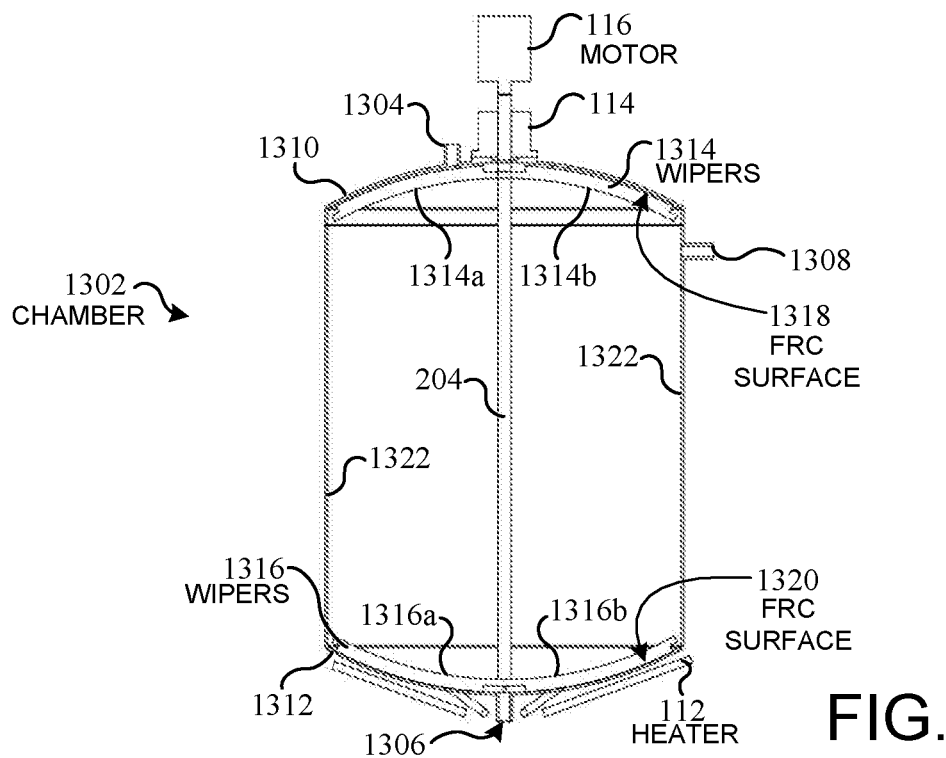
FIG. 14 shows a cross-section view of the evaporation chamber shown in FIG. 13.

FIG. 14 shows a cross-section view of the evaporation chamber 1302 that is similar to the chamber 700 but includes additional features to provide wiped film distillation.

In an embodiment, the chamber 1302 includes a curved top portion 1310 that provides a flow rate control surface 1318 that is exposed inside the evaporation chamber 1302. The chamber 1302 also includes wipers 1314a-b that are connected to the shaft 204 and shaped to have the same contour and to wipe across the flow rate control surface 1318. The top 1310 also includes the return port 1304 that is used to introduce the recirculated solution into the chamber 1302.

The chamber 1302 includes a curved bottom portion 1312 that provides a flow rate control surface 1320 that is exposed inside the evaporation chamber 1302. The chamber 1302 also includes wipers 1316a-b that are connected to the shaft 204 and shaped to have the same contour and to wipe across the flow rate control surface 1320. The bottom portion 1312 also includes the recirculation port 1306 that is used to recirculate solution back to the return port 1304 and into the chamber 1302. The surfaces 1318 and 1320 may have the same or different contours.

The chamber 1302 also includes a cylindrical side portion 1322 that connects the top portion 1310 to the bottom portion 1312. During operation of the chamber 1302, the solution introduced into the chamber using the return port 1304 flows along the top surface 1318 to its outer edge and then down the side portion 1322 to the bottom portion 1312.

The solution flows along the flow rate control surface 1318 as it is moved by wipers 1314a-b toward the side portion 1322. The solution flows down the side portion 1322 and along the bottom portion 1312. The solution flows down along the flow rate control surface 1320 as it is moved by wipers 1316a-b toward the recirculation port 1306. It should be noted that the flow rate control surfaces 1318 and 1320 may provide the same flow rates or different flow rates.

Figure 15:
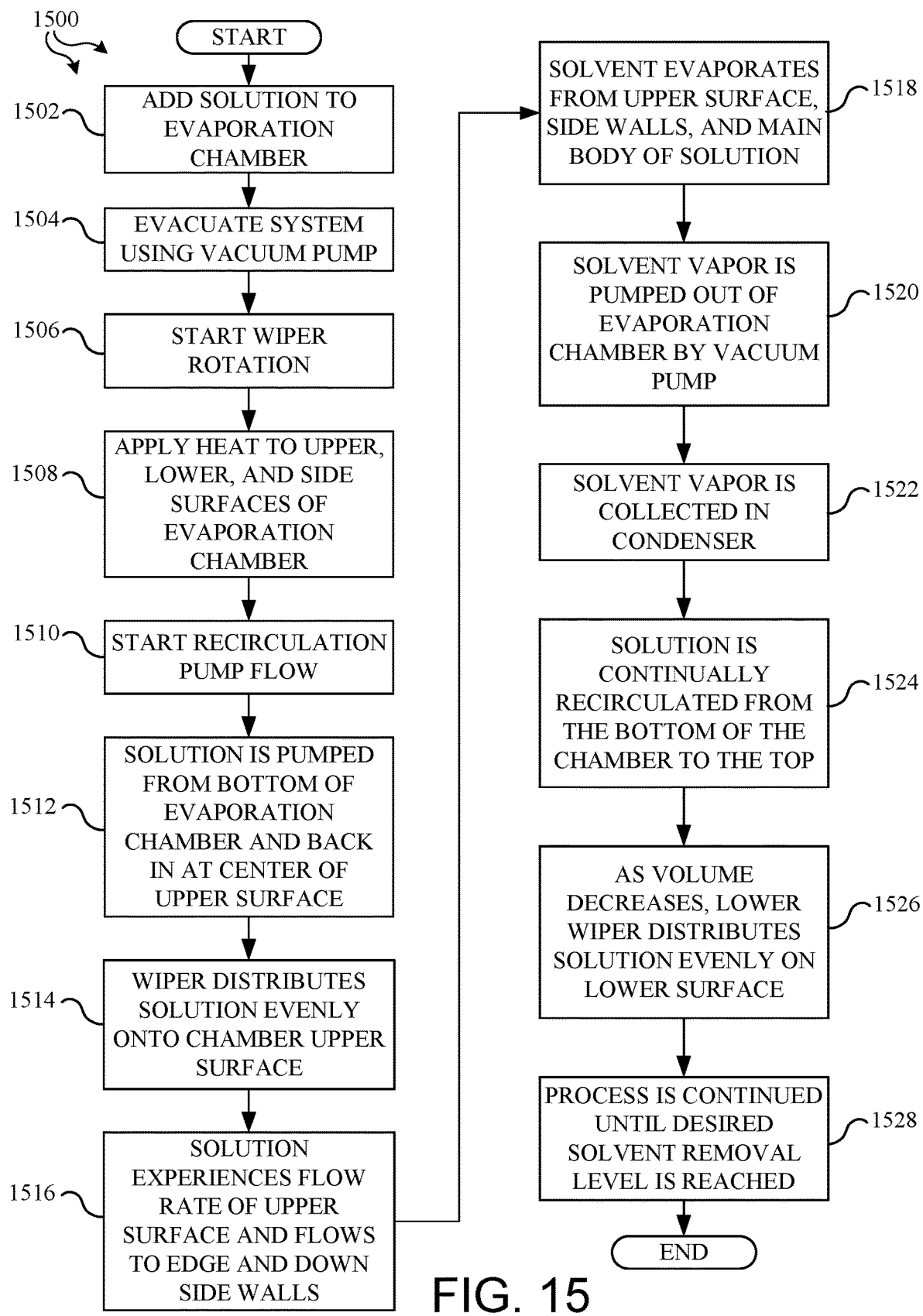
FIG. 15 shows an embodiment of a method for operating a vacuum distillation apparatus having an evaporation chamber as shown in FIG. 13.

FIG. 15 shows an embodiment of a method 1500 for operating a vacuum distillation apparatus having an evaporation chamber as shown in FIG. 13. For example, the method 1500 will be described with reference to the distillation apparatus shown in FIG. 13 and having an evaporation chamber as shown in FIG. 14 with a selected FRC surface as shown in FIG. 4. For example, an elliptical flow rate control surface can be utilized.

At block 1502, solution is added to an evaporation chamber. For example, the solution to be distilled is manually or automatically added to the evaporation chamber 1302.

At block 1504, the distillation system is evacuated using a vacuum pump. For example, the processor 902 controls the vacuum pump interface 916 to start the vacuum pump 124 and maintains a desired vacuum pressure. The desired vacuum pressure may be provided by a user through the user interface 906.

At block 1506, surface wipers are started in rotation. For example, the processor 902 controls the motor interface 908 to activate the motor 116 to turn at a selected speed. The wipers 1314a-b and 1316a-b that are coupled to the motor 116 will turn at this same speed. The desired wiper speed may be provided by a user through the user interface 906. Additional mechanisms may be provided to allow the wipers 1314a-b and 1316a-b to turn at different speeds.

At block 1508, heat is applied to the upper, lower, and side surfaces of the evaporation chamber. For example, the processor 902 controls the heater interface 910 to activate the heater 112 to achieve a desired chamber temperature. The temperature sensor 118 in the chamber measures the temperature and provides these measurements to the temperature sensor interface 914, which passes these measurements to the processor 902. Thus, the processor 902 is able to monitor the chamber temperature and control the heater 112 to achieve a desired temperature. The desired temperature may be provided by a user through the user interface 906.

At block 1510, a circulation pump is started to move the solution from the evaporation chamber. For example, the processor 902 controls the pump interface 912 to activate the circulation pump 104 to begin pumping solution from the recirculation port 1306 of the evaporation chamber 1302.

At block 1512, the solution is pumped into the evaporation chamber at the center of the upper surface. For example, the circulation pump 104 pumps the solution from the recirculation port 1306 through the pipe 1324 and back into the evaporation chamber 1302 through the return port 1304.

At block 1514, the wipers operate to evenly distribute solution across the upper flow rate control surface and down the side surface. For example, the wipers 1314a-b are turned by the motor 116 to evenly distribute the solution across the upper flow rate control surface 1318.

At block 1516, the solution experiences the flow rate of the upper FRC surface 1318 and flows to the edge of the upper surface and down the side surface 1322.

At block 1518, solvent evaporates from the solution. For example, the solvent evaporates from the upper surface 1318, sidewall surface 1322, and main body of solution at the bottom of the chamber 1302.

At block 1520, the solvent vapor is pumped out of the evaporation chamber by the vacuum pump. For example, the operation of the vacuum pump 124 pumps the solvent vapor out through the exit port 1308.

At block 1522, the solvent vapor is collected in a condenser. For example, the solvent vapor flows into the condenser 122.

At block 1524, the solution is continually recirculated from the bottom of the chamber to the top. For example, the portion of the solution that does not evaporate in the evaporation chamber flows out the bottom recirculation port 1306 and is routed back to the chamber through the return port 1304.

At block 1526, as the volume of the solution decreases, the lower wipers distribute the solution evenly on the lower flow rate control surface. For example, the wipers 1316a-b distribute the solution along the flow rate control surface 1320. The solution experiences the flow rate of the lower flow rate control surface 1320 and additional solvent evaporates.

At block 1528, the process continues until the desired solvent removal level is reached. For example, the solvent captured in the condenser 122 is measured to determine when the desired solvent removal level is reached. When the desired level is reached, the controller 128 shuts down operation of the distillation apparatus 1300.

Thus, the method 1500 operates a vacuum distillation apparatus to remove a solvent from a solution. It should be noted that the operations of the method 1500 may be added to, subtracted from, deleted, changed, rearranged or otherwise modified within the scope of the embodiments.

Although certain specific embodiments are described above in order to illustrate the invention, the invention is not limited to the specific embodiments. Accordingly, various modifications, adaptations, and combinations of various features of the described embodiments can be practiced without departing from the scope of the invention as set forth in the claims.

What is claimed is:

1. An apparatus, comprising:
    an evaporation chamber having a bottom flow rate control (FRC) surface that is curved to provide multiple flow rates to a solution as it flows across the bottom surface;
    a wiper that wipes the bottom FRC surface to distribute the solution, wherein the wiper is curved to match the curve of the bottom FRC surface; and
    a heater that heats the bottom FRC surface to evaporate the solution to produce a vapor, wherein the evaporation chamber further comprises:
        a top flow rate control (FRC) surface that is curved to provide multiple flow rates to the solution as it flows across the top surface; and
        a second wiper that wipes the top FRC surface to distribute the solution to an outer edge of the top surface, and wherein the second wiper is curved to match the curve of the top FRC surface.

2. The apparatus of claim 1, further comprising a vacuum pump that creates a vacuum in the evaporation chamber.

3. The apparatus of claim 1, wherein the curve of the top FRC surface forms one of a hemispherical shape or an elliptical shape.

4. The apparatus of claim 1, further comprising one or more additional second wipers that wipe the top FRC surface to distribute the solution, wherein the additional second wipers are curved to match the curve of the top FRC surface.

5. The apparatus of claim 1, further comprising an exit port in the bottom FRC surface into which unevaporated solution can flow.

6. The apparatus of claim 1, further comprising a motor that moves the wiper and the second wiper across the bottom and top FRC surfaces, respectively.

7. The apparatus of claim 1, further comprising a controller that controls evacuation of the chamber, controls the movement of the first and second wipers, adjusts the temperature of the chamber, and controls flow of the solution into the chamber.

8. An apparatus comprising:
    an evaporation chamber having a bottom flow rate control (FRC) surface that is curved to provide multiple flow rates to a solution as it flows across the bottom surface;
    a wiper that wipes the bottom FRC surface to distribute the solution, wherein the wiper is curved to match the curve of the bottom FRC surface; and
    a heater that heats the bottom FRC surface to evaporate the solution to produce a vapor, wherein the evaporation chamber further comprises a top surface that is selectively spaced above the bottom FRC surface, and wherein the top surface is shaped so that at least a portion of the vapor condenses on the top surface and flows along the shape of the top surface to a collection location.

9. The apparatus of claim 8, wherein the curve of the bottom FRC surface forms a hemispherical shape.

10. The apparatus of claim 8, wherein the curve of the bottom FRC surface forms an elliptical shape.

11. The apparatus of claim 8, wherein the curve of the bottom FRC surface forms a curved shape that produces a desired flow rate.

12. The apparatus of claim 8, further comprising one or more additional wipers that wipe the bottom FRC surface to distribute the solution, wherein the additional wipers are curved to match the curve of the bottom FRC surface.

13. The apparatus of claim 8, further comprising a motor coupled to the wiper to move the wiper across the bottom FRC surface.

14. The apparatus of claim 8, further comprising a cooling system to maintain the top surface at a selected temperature at which the at least a portion of the vapor condenses to form a second solution.

15. The apparatus of claim 8, further comprising a collector located in the bottom FRC surface into which the second solution can flow.

16. The apparatus of claim 8, further comprising an exit port in the bottom FRC surface into which unevaporated solution can flow.

17. A method for operating an evaporation chamber having a top flow rate control (FRC) surface that is curved to provide multiple flow rates to a solution, and a wiper that is curved to match the curve of the top FRC surface and that wipes the top FRC surface to distribute the solution, the method comprising:
    heating the top FRC surface;
    adding the solution to the chamber so that the solution flows across the top FRC surface at the multiple flow rates, is distributed by the wiper, and at least a portion of the solution evaporates to form a vapor;
    collecting the vapor; and
    circulating remaining solution back into the chamber.

* * * * *